US009468934B2

(12) United States Patent
Fogel et al.

(10) Patent No.: US 9,468,934 B2
(45) Date of Patent: Oct. 18, 2016

(54) MIXTURE SEPARATION DEVICE WITH DETACHED FREE ROLLING BARS

(71) Applicant: EXACTRATION, LLC, Mooresville, NC (US)

(72) Inventors: Richard E. Fogel, Mooresville, NC (US); Brent D. Terrell, Bardstown, KY (US)

(73) Assignee: Exactration, LLC, Mooresville, NC (US)

( * ) Notice: Subject to any disclaimer, the term of this patent is extended or adjusted under 35 U.S.C. 154(b) by 25 days.

(21) Appl. No.: 14/246,466

(22) Filed: Apr. 7, 2014

(65) Prior Publication Data

US 2014/0216999 A1 Aug. 7, 2014

Related U.S. Application Data

(63) Continuation of application No. 12/953,575, filed on Nov. 24, 2010, now Pat. No. 8,689,984.

(51) Int. Cl.
| | |
|---|---|
| *B01D 33/00* | (2006.01) |
| *B01D 33/06* | (2006.01) |
| *B01D 33/333* | (2006.01) |

(Continued)

(52) U.S. Cl.
CPC ............ *B03C 1/20* (2013.01); *B01D 21/0006* (2013.01); *B01D 21/0009* (2013.01); *B01D 21/245* (2013.01); *B03C 1/03* (2013.01);
(Continued)

(58) Field of Classification Search
CPC ............ B03C 1/20; B03C 1/03; B03C 1/30; B03C 1/284; B03C 1/286; B03C 1/18; B03C 1/12; B01D 21/0009; B01D 21/245; B01D 21/0006

USPC .............. 210/222, 223, 359, 385, 391, 396; 55/400, 403, 408
See application file for complete search history.

(56) References Cited

U.S. PATENT DOCUMENTS

| | | |
|---|---|---|
| 3,216,574 A | 11/1965 | Lammers |
| 3,850,027 A | 11/1974 | Nakanishi et al. |

(Continued)

FOREIGN PATENT DOCUMENTS

| | | |
|---|---|---|
| DE | 3224809 A1 | 5/1984 |
| EP | 1123741 A2 | 8/2001 |

(Continued)

OTHER PUBLICATIONS

Magne-Tight—magnetic separator brochure by Filtra Systems, date unknown.

(Continued)

*Primary Examiner* — Fred Prince
(74) *Attorney, Agent, or Firm* — Additon, Higgins & Pendleton, P.A.

(57) ABSTRACT

A device for separating components of a mixture, particularly industrial fluids but also gases including air, allows for targeted components of the mixture to be attached onto a separating bar and removed from the mixture. The separating bars traverse a track formed within the body of the separating device and through respective tank, cleaning, free roll, and compression regions in a controlled cleaning system. The separating bars are detached from one another and allowed to move through the separating device independently of one another. The device removes the use of chains to connect cleaning bars traversing through a cleaning system.

20 Claims, 9 Drawing Sheets

(51) Int. Cl.
  *B03C 1/20* (2006.01)
  *B01D 21/00* (2006.01)
  *B01D 21/24* (2006.01)
  *B03C 1/03* (2006.01)
  *B03C 1/30* (2006.01)
  *B03C 1/28* (2006.01)

(52) U.S. Cl.
  CPC .............. *B03C 1/284* (2013.01); *B03C 1/286* (2013.01); *B03C 1/30* (2013.01)

(56) References Cited

U.S. PATENT DOCUMENTS

| | | |
|---|---|---|
| 4,039,447 A | 8/1977 | Miura et al. |
| 4,209,403 A | 6/1980 | Dorgathen |
| 4,320,842 A * | 3/1982 | Rudd .................. B03C 1/284 209/218 |
| 4,561,975 A | 12/1985 | Schloss, Jr. |
| 5,338,443 A | 8/1994 | McEwen |
| 5,800,701 A | 9/1998 | Larsen |
| 6,066,255 A | 5/2000 | Anderson |
| 6,106,227 A | 8/2000 | Honda et al. |
| 6,454,940 B1 | 9/2002 | Walters |
| 6,638,430 B2 | 10/2003 | Bratten |
| 6,896,801 B2 | 5/2005 | Anderson et al. |
| 8,689,984 B2 | 4/2014 | Fogel et al. |

FOREIGN PATENT DOCUMENTS

| | | |
|---|---|---|
| GB | 190400297 | 0/1904 |
| GB | 190414465 | 0/1904 |
| GB | 418172 | 10/1934 |
| GB | 454558 | 9/1936 |
| GB | 887491 | 1/1962 |
| JP | 02-172509 | 7/1990 |

OTHER PUBLICATIONS

Barmag—high efficiency bar-type magnetic separators brochure by Mann Hummel, date unknown.

* cited by examiner

MIXTURE SEPARATION DEVICE WITH DETACHED FREE ROLLING BARS

CROSS-REFERENCE TO RELATED APPLICATIONS

This application claims the benefit of U.S. patent application Ser. No. 12/953,575 for a Mixture Separation Device with Detached Free Rolling Bars filed Nov. 24, 2010 (and published May 24, 2012 as U.S. Patent Application Publication No. 2012/0125827), now U.S. Pat. No. 8,689,984. Each of the foregoing patent application, publication and patent is hereby incorporated by reference in its entirety.

FIELD OF THE INVENTION

The invention relates to the field of mixture separation tanks utilizing separating bars moving through the mixture.

BACKGROUND

Separating tanks have been used for industrial purposes for decades. Some of the earliest versions allowed for very simple processes such as settling solids to the bottom of a tank containing a liquid suspension. Other separating tanks used stirrers, flotation devices, skimmers, and various filters to remove one substance from another (e.g., U.S. Pat. No. 4,039,447 (Miura 1977) shows magnetic plates in a tank for separating solids from waste water.). Over time, chemical, electrical, and more advanced mechanical processes have made separating tanks more efficient. One particular kind of separating tank is the separating bar tank utilizing specialized elongated bars that move through a mixture at a controlled rate. The separating bars are "active" within the mixture in that they change the mixture physically, chemically or electrically to remove a target substance from a mixture. In other words, the separating bars are engineered for a particular purpose in removing a target substance from the mixture at issue.

As separating tanks have become more prevalent in industrial settings, engineers discovered the expediency of utilizing moving bars in tanks for separation purposes. The bars had increased surface areas due to their cylindrical shapes and offered more opportunities for contacting greater volumes of a mixture simultaneously. For example, U.S. Pat. No. 4,209,403 (Dorgathan 1980) shows a separation tank utilizing bars for magnetic separation. Dorgathan arranged the bars in an immobilized wall through which the mixture flowed. Magnetic materials collected onto the bars and a scraping mechanism cleaned the collected materials.

Later mechanisms included an apparatus set forth in U.S. Pat. No. 6,066,255 (Anderson, 2000) which shows a conveyor belt with cleaning scraper bars connected onto the belt. The conveyor belt has a filtering mechanism and the bars remove collected sediment that has been filtered from an industrial cooling fluid.

Modern separation tanks utilizing bars moving through a solution are shown in patent literature by Bratten. See, e.g., U.S. Pat. No. 6,638,430 (2003); European Patent No. 1,123,741 (2001). Bratten utilizes bars moving through a mixture in a tank but connected by a chain controlled by a motor. In this regard, Bratten shows a magnetic separator and a process using "a train of parallel, spaced magnetic bars connected together to form a closed loop" within a mixture. The bars are shown as being made of stainless steel tubes with magnetic portions therein. Bratten's bars are consistently shown as connected by links in a chain.

Because prior art separating bars are connected, the systems of earlier separation tanks require all bars to move at the same rate in continuous fashion. This allows for no customization other than the mere speed of the chain holding the bars together. A need exists in the art for separation tanks using separating bars that move independently, allowing for more optimization in the number of separating bars in a given system, the rate at which bars move, and the position of each bar at particular places within the mixture. In other words, a need exists in the art for a separation device that is scalable and customizable for more diverse applications and less cumbersome maintenance.

BRIEF SUMMARY

The invention is a separating device utilizing separating bars that move independently through a mixture. The separating bars are initially pushed by a mechanism controlled by a mechanical belt such that the separating bars move through a mixture at a controlled rate. The separating bars are designed to be chemically, electrically, or mechanically active such that as they move independently through the mixture, they separate at least one target substance from the mixture.

One embodiment of the device uses magnetic bars to remove magnetic and paramagnetic particulates from industrial coolant solutions generated by most types of machining, grinding, honing, or boring operations in the machine tool metal cutting industry, as well as the rolling and cleaning of ferrous and steel strips.

The device disclosed herein is characterized in part by its ability to:

a. efficiently remove magnetic and paramagnetic particulates from within the solution as generated by the particular metal working processes;

b. improve the cleanliness of a solution to improve metal working processes;

c. improve the cleanliness of the solution using high strength magnetic bars to attract and remove unwanted magnetic and paramagnetic particles to extend the useful life of an industrial solution or mixture;

d. minimize the maintenance and operating costs by eliminating the chains used to hold prior art separating bars together;

e. reduce filter aids and consumable media to provide environmentally friendly solutions to mixture separation;

f. improve recovery rates of a target substance without the target being bound to filter media or filter aids; and g. provide a separation tank that is easier to clean, maintain, and replace.

The separation device disclosed herein utilizes a track in the form of a cut-out on opposite walls of the device that allows for the separating bars to traverse the interior of the device. The separating bars may be constructed of durable materials, including but not limited to, stainless steel tubes with high Gaussian strength magnets encapsulated therein, cloth-type cartridge element tubes, tentacle type tubular structures, polypropylene (i.e., fuzzy) bars, and the like.

DETAILED DESCRIPTION

The device of this invention is a separating tank that utilizes separating bars which are specially designed to assist in removing parts of a mixture from other components in the mixture. In one sense, the separating bars are engineered to remove a "target substance" from a mixture. The term "target substance" is used in its broadest sense to mean, without limitation, any component of a mixture that can be identified and removed due to one of its physical properties. The physical property used to remove the target substance can include, but is not limited to, the target substance's size, shape, molecular composition, chemical nature, electrical properties, mechanical properties, magnetic properties, electromagnetic properties and the like. The target substance may be removed by focusing on its surface tension in relation to another device. These features of the target substance can be taken into account in designing mechanical features of a separating tank and separating bars used in the tank. The separating bars may have a physical component that corresponds to the identifying features of the target substance to allow or even encourage the target substance to accumulate on or inside the separating bars. The device shown herein removes the target substance from the separating bars and thereby removes the target substance from the mixture at hand.

The separating device is designed for a wide range of industries such as, but not limited to, algae harvesting, magnetic and paramagnetic metal cutting (grinding, honing, super-finishing), coil steel rolling, magnetic and paramagnetic dust collection and coolant filtration. The device is engineered with scalability in mind so that its functionality translates to industries that utilize mixtures in a wide range of volumes.

The mixtures used with the separating device shown herein include liquid solutions and suspensions, mixtures of liquids, mixtures of solids, mixtures of gases, and combinations thereof. The mixtures may incorporate water, air, and all solids. In one embodiment of a gaseous mixture, the device and system disclosed herein may be used to control and clean emissions from various mechanical and chemical processes.

Figure 1:
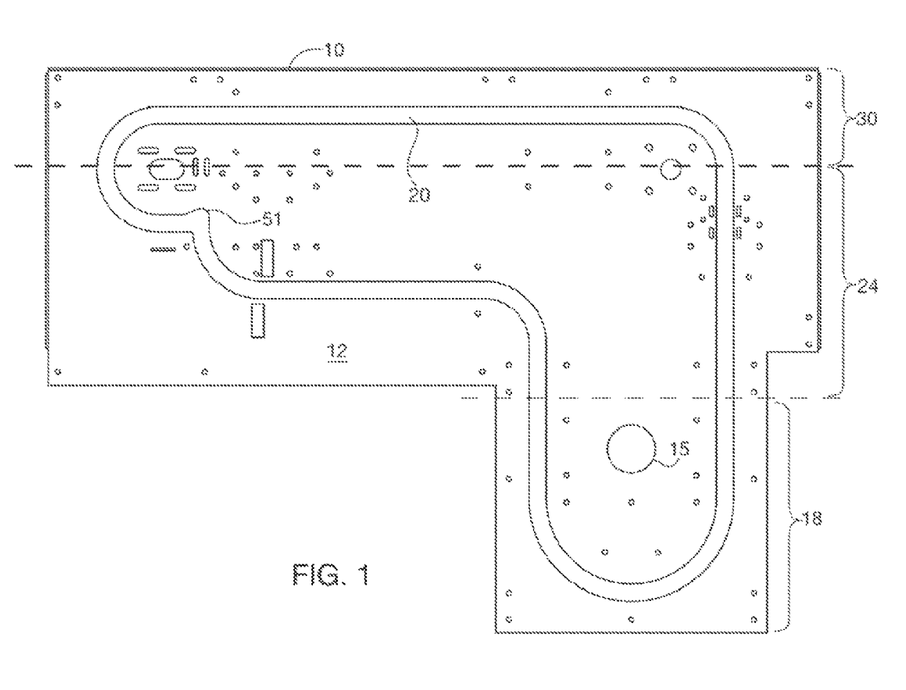
FIG. 1 is a side view of one wall of the separating device shown herein with a cut-out for the track in which separating bars travel.

FIG. 1 shows a first described view of the separation device (10) and illustrates one wall of the enclosure in which a mixture may be separated by separating bars. The wall (12) includes a cut out groove or track (20) that provides a rail in which separating bars (FIGS. 3A, 3B, and 3C, Reference Nos. 35A, 35B, 35C, and 35D) may traverse the enclosure. Implementing the track (20) as a cut-out is only one example of the kind of track that can be used and is not limiting of the invention. The track (20) may take any convenient form or shape, including adding a separate railing to the walls of the device. In the embodiment shown by example in FIG. 1, the track (20) is a continuous loop cut out of two opposing walls (12) of the separating device (10), allowing for at least one, and more likely, a plurality of separating bars (35) to extend between the opposing walls (12) and traverse the track (20). In one exemplary embodiment, the separating bars (35) are entirely disconnected from one another and traverse the track freely by rolling along horizontal sections and dropping down vertical sections of the track (20). The separating device (10) and its track (20) may be a carbon steel, stainless steel, plastic, or other durable material.

As noted above, other versions of the track may include a nesting design that allows for separately disposed sets of separating bars traversing their respective tracks within the same device. This kind of nesting would be particularly useful if one set of the separating bars accomplished a first function (such a catalytic function) and the second set of separating bars accomplished a second function (such as filtration).

Utilizing independent, preferably detached separating bars (35) allows for the convenience of removing any number of the separating bars from the device (10). This feature also provides an opportunity for the bars to be utilized in stages because removing and replacing the bars in the device can be accomplished one at a time or on a batch basis. The separating bars could also be removed without shutting down the entire separation process by engineering the device (10) with a separating bar removal section that works in unison with a separating bar entry section.

The separating bars, therefore, are adaptable in function and can take on many shapes and features to accomplish different purposes. For example, the separating bars (35) may be coated to have chemically active surfaces and enter the device (10) to serve as a catalyst or another chemical function therein. By being separable and not connected to any of the drive chains shown in prior systems, the bars may be single use bars that are removed and shipped to a completely different location or may be disposable, or the bars may be removed for re-conditioning in an adjacent staging area (i.e., semi-permanent use). This operation would allow for separating bars to be set up in stages for processing the separating bars with proper coatings and drying the separating bars before their re-entry into the device (10). Another application that could take advantage of the separable bars is that of electrically charged bars being staged for recharging. The electrically charged bars could incorporate batteries on the inside of sealed, liquid impermeable chambers, and those batteries could be replaced much easier when the separating bars are not connected to each other. In yet another embodiment, the separating bars (35) may be coated with rosin that provides a sticky surface for catching components of a mixture for removal.

One significant technology that is possible with the device described herein is that of air filtration. The separating bars (35) may be in the form air filtration or air separation cylinders because the separating bars can be sealed for applying a vacuum or air pressure. The filtration system may use separating bars that are made for use with particular components of nonwoven, metal, or polymeric filters.

To describe the separation device (10) of this invention, the device may be shown as consisting of three different sections as set forth in FIG. 1. The lowest section of the separating device is the tank region (18) that fits within a vat or other enclosure holding the mixture to be separated. The tank region includes an inlet (14) and an outlet (15) to control the flow of the mixture into and out of the tank region (18). The region of the separating device directly above the tank region is the compression region (24) which gets its name from the fact that the separating bars (35) traversing the separating device (10) are in close proximity to one another and press against each other without being directly or permanently connected. The compression section (24) is also the region of the device in which controls are placed for ensuring proper placement and delivery of the separating bars to and from the tank (10). See FIG. 2. The third and uppermost region in the separation device (10) is the free roll region (30) in which the separating bars (35) roll along substantially horizontal regions of the track (20). The free roll region is largely controlled by a push mechanism that imparts energy to the individual separating bars (35), discussed in more detail below.

Figure 2:
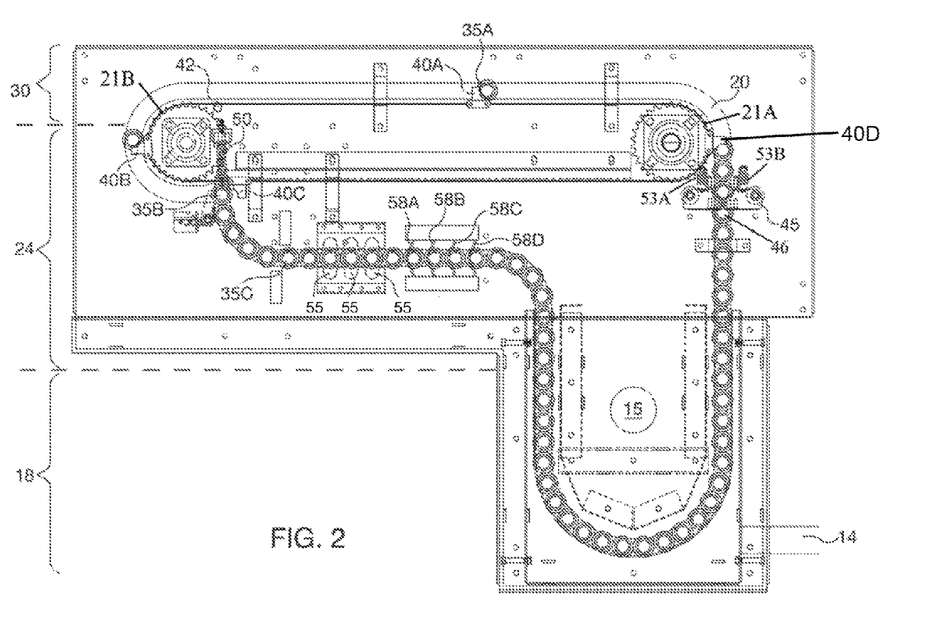
FIG. 2 is a cross section view of the separating device shown herein with separating bars traversing the enclosure and engaging respective tracks on opposite walls of the device.

FIG. 2 shows a more intricate view of the separating device (10) in operation with the separating bars (35A, 35B, 35C) in place. FIG. 2 is a cross section of the overall separating device. Starting at the top of the separating device (10) in the free roll section (30), a belt (42) (also known as a carrier or chain mechanism) is driven by a variable speed reducer coupled to a drive shaft and sprocket (21A, 21B) that advance a belt that includes periodically placed push mechanisms (40A, 40B, and 40C) to move the separating bars (35) from one region of the separating device (10) to another.

Shown most clearly at the intersection of the compression region (24) and the free roll region (30) of the separating device, the belt (42) extends substantially parallel to a horizontal portion of the track (20) holding the separating bars (20). A series of push mechanisms (40A, 40B, 40C) are spaced apart and connect to the belt to engage a respective separating bar (35) as desired to move the separating bars along the track (20). The push mechanisms may be any elevated ridge or lip on the belt (42) that pushes the separating bars along the track and allows it to roll along the opposite walls (12) of the enclosure. The number and spacing of the push mechanisms (40A, 40B, 40C) allow for optimal placement of the separating bars in the mixture tank region (18).

The push mechanisms (40A, 40B, 40C) move a respective bar along the track (20) with particular ease along the free roll region (30). At one end of the free roll region, the push mechanisms move each separating bar to the controlled release mechanism (45) to allow a separating bar to push against other separating bars (35) that are in a vertical component of the track (20) and within the compression region (24) of the separating tank. At another end of the separating device, opposite the controlled release mechanism (45), the track includes an upwardly projecting notch or curve in which a separating bar exits the compression region and positions itself to be "picked up" by a push mechanism (40C) on the belt (42). The entry of a first separating bar into the compression region (24) (via the controlled release mechanism (45) by the force of a corresponding push bar (40D)) moves an opposite separating bar (35B) into the lip or notch (FIG. 1, Reference No. 51) of the track (20). Once in the notch (51) of the track (20), a separating bar (35B) is in a position to be picked up or pushed by a push mechanism (40C). In other words, the separating bars (35) move (or more specifically roll) within the track (20) as a controlled system with particular timing.

The controlled entry into and exit from the compression region (24) of the device (10) may be described as a calculated indexing function that moves the separating bars (35) by a known amount, typically by the diameter of one bar. The device (10) may be described in certain embodiments as having a sealing function at the entry and exit points of the compression section (24). For example, the controlled release mechanism (45) may be designed to seal off the lower portion of the device by pressing against an adjacent separating bar (46). Of course, the position of the controlled release mechanism (45) could be adjusted to place the seal in any location within the device (10). A similar seal could be installed at the exit section of the compression region along the lip or notch of the track (51). This sealing ability allows the device to be used for chemical reactions or filtration requiring specialized pressure in portions of the device (10).

The above noted indexing of the bars does not necessarily require any kind of programmable logic controller to insure that the bars move at a particular rate along the track. The bars traverse the device according to the speed of the motor driving the belt (42) and the push mechanisms (40). The motor speed determines the rate at which one push mechanism picks up a bar as another moves a bar down into the compression region (24). The indexing is accomplished via motor speed and the fact that the controlled release mechanism (45) may be configured to prevent the separating bars (35) to back slide out of the compression region and back into the free roll section of the device.

As one separating bar is released through the controlled release mechanism (45) into compression with other separating bars in the tank region (18), a different and opposite separating bar (35B) moves into a notch (51) designed into the shape of the track (20). The separating bar (35B) in the notch (51) maintains the compression of the numerous adjacent separating bars in the system via a spring (50) that pushes downward on the separating bar (35B). This maintains the compression needed for controlling the position of the separating bars throughout the separation device (10). The force of the push mechanism is controlled by a motor driving the belt.

Figure 5A:
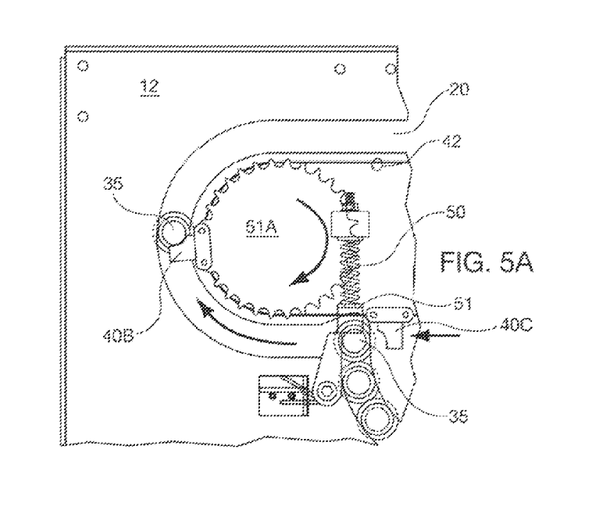
FIG. 5A is a side view of the track used for moving separating bars through a mixture by pushing the bars with a push mechanism.
Figure 5B:
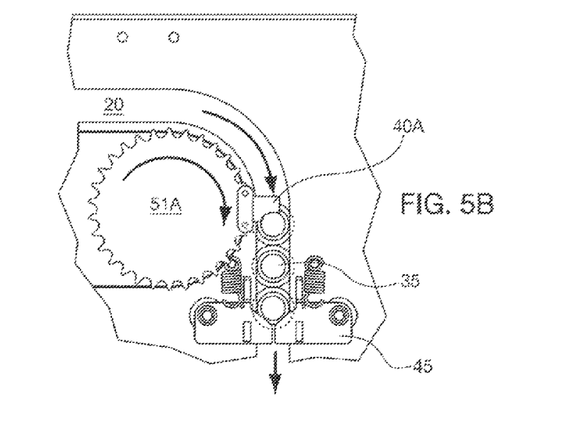
FIG. 5B is a side view of a track used in the device disclosed herein and showing a push mechanism moving separating bars through a control mechanism.

The opposite ends of the compression system are shown most clearly in FIGS. 5A and 5B. FIG. 5B shows that a push mechanism (40A) moves along the belt (42) driven by motorized sprocket (51A). The push mechanism (40A) exerts pressure on the controlled release mechanism (45) via a separation bar (46). The controlled release mechanism opens at a sufficient, predetermined force as set by springs (53A, B) attached between the body of the separation device (10) and the controlled release mechanism (45). In one embodiment, the controlled release mechanism (45) is in the form of "shutter doors" that allow a separation bar (46) to push its way through into the compression region (24) of the separation device (10). The separation bar (46) is pushed far enough through the compression section (24) such that it causes the spring (50) (at the exit of compression) to exert sufficient axial force to push downwardly onto the exiting separating bar (35B) to maintain a continuous or constant spreading of the separation bars within the system. The controlled release mechanism (45), therefore, sets the pace at which bars exit the compression region (24) and get picked up by a push mechanism (40C).

FIG. 5A shows the opposite end of the controlled compression system in that an opposite separation bar (35) is pushed upward into the notch (51) shaped into the track (20). Spring (50) opposes the force of the dropping bar from the controlled release mechanism (45) maintains sufficient compression in the overall system to ensure that the appropriate separation bars (35) are in designated portions of the separation tank to remove a target component from the subject mixture. The embodiments of FIGS. 5A and 5B show a system that is mechanically timed by the force of the separating bars pushing through the controlled release mechanism (45) and different bar pushing up into the notch (51). This system provides for indexing the separating bars through the system without requiring computerized control systems (i.e., the system is mechanically timed instead of electrically timed).

Returning to FIG. 2, the compression system described above places a designated number of separation bars in proximity or even in contact with a mixture fed into the tank region (18) of the separation device (10). The tank region, of course, is the region of the separation device in which the target substance is removed from a mixture due to the physical and chemical properties of the mixture and the separation bars. The separation device described herein allows for the bars to move through the mixture and actively separate components of the mixture. In some embodiments, the target substance is collected onto the separation bars (35) and must be removed accordingly to allow the separation bars to recycle through the mixture more than once.

Figure 6:
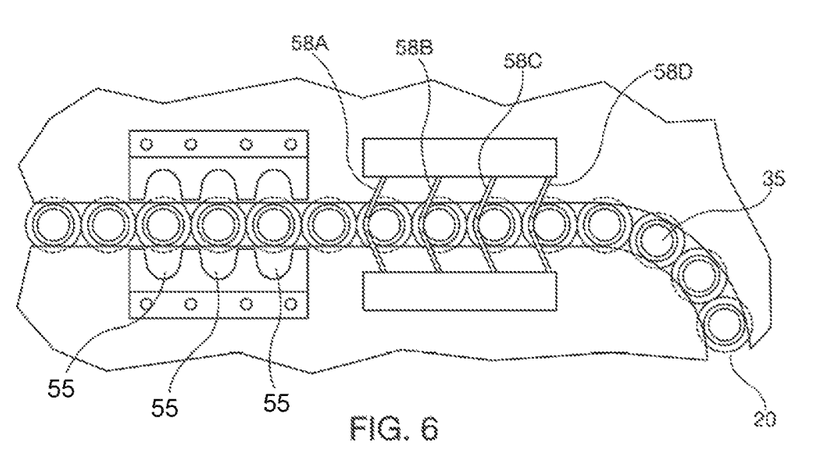
FIG. 6 is a cross sectional view of the cleaning sections through which separating bars move to remove target substances collected thereon.
Figure 7:
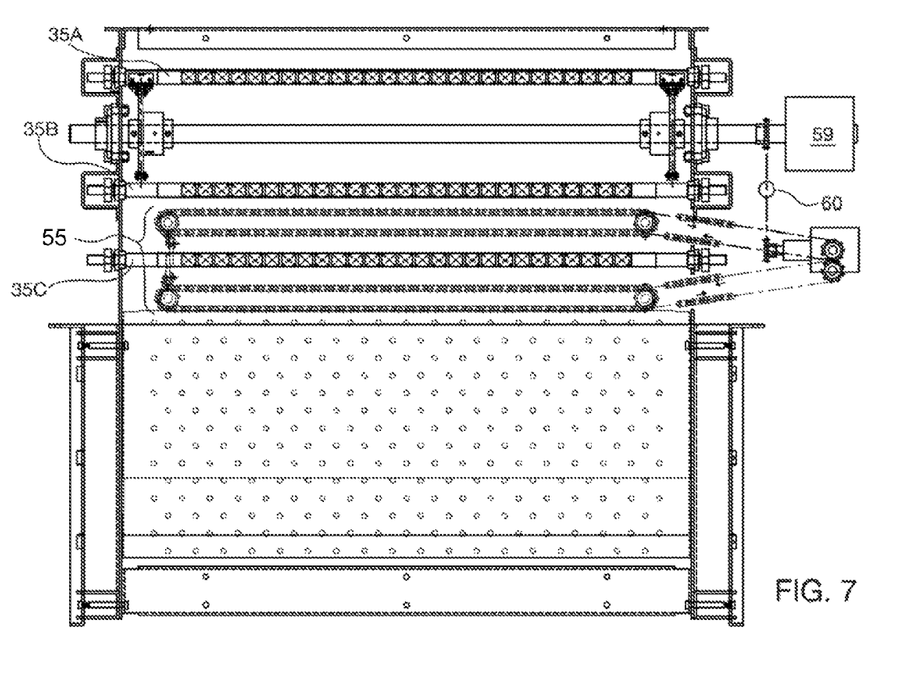
FIG. 7 is a cross sectional view of the overall device disclosed herein and from the perspective of one end of the device with separating bars traversing different sections of the device.

The separation device (10) incorporates at least one cleaning section in the path of the track (20). FIG. 2 shows two cleaning sections, and either or both may be included in working embodiments of the invention. First, FIG. 2 shows scraper blades (58A-58D) that extend upwardly and downwardly across separating bars traversing the path of the track (20). The scraping blades may be angled to cover the most surface area possible as the separating bars roll through the track. As the scraping blades remove collected material, usually the above noted target substance, the target substance may be removed from the separating device by either dropping out into a hopper (not shown) or by washing or some other means of removal. In another cleaning system shown in more detail in FIGS. 6 and 7, the separating bars may be scraped by a chain driven bar wiper conveyor. In the bar wiper conveyor embodiment, a shaped wiper scrapes across the entire length of each separating bar as it moves into the position shown at FIG. 7, Reference 35C. The separating bar (35C) is between two sprocket driven chains that wipe the separating bars at the appropriate places. Also shown in FIG. 7 is a single motor (59) driving the above noted belt (42) and the cleaning wiper assembly (55). In other embodiments, the single motor may be a geared motor or a combination reducer and motor assembly. Again, the cleaning wiper assembly (55) may feed the collected target substance removed from the separating bars into a hopper or other outlet.

Figures 3A, 3B, 3C:
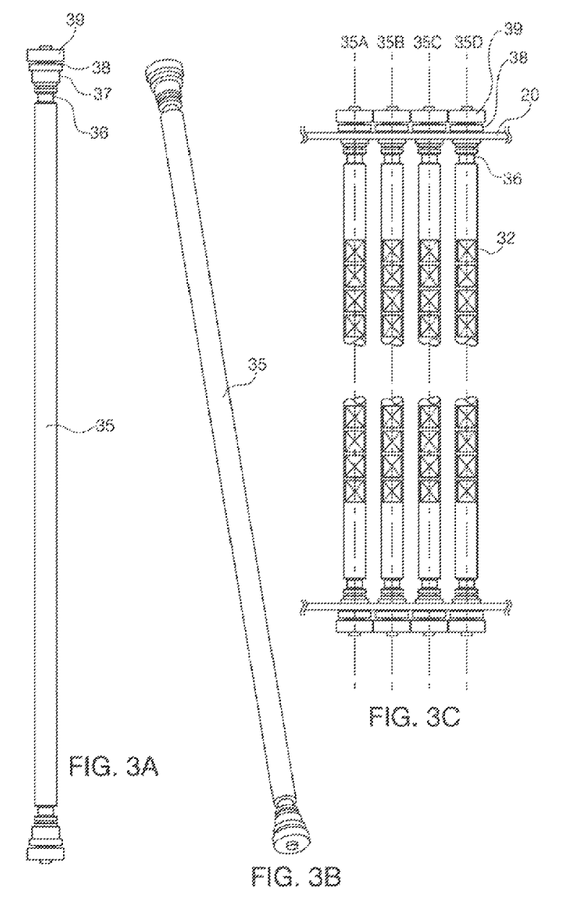
FIG. 3A is a side view of a separating bar for inclusion in the device shown herein.
FIG. 3B is a perspective view of a separating bar of FIG. 3A.
FIG. 3C is a top view of several adjacent separating bars traversing the track in the device shown herein.
Figure 4A:
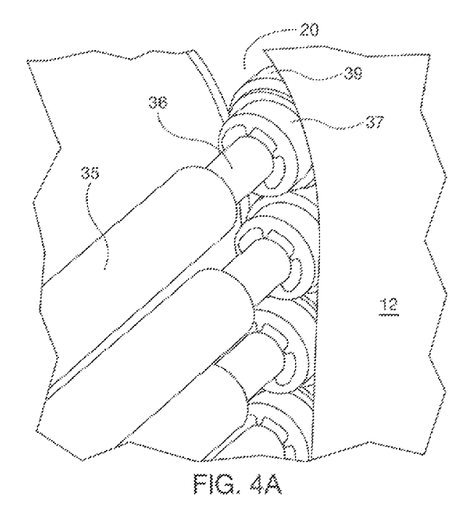
FIG. 4A is a side view of the separating bars of FIG. 3C engaging the track of the invention herein via wheel attached to the separating bar by an axle.
Figure 4B:
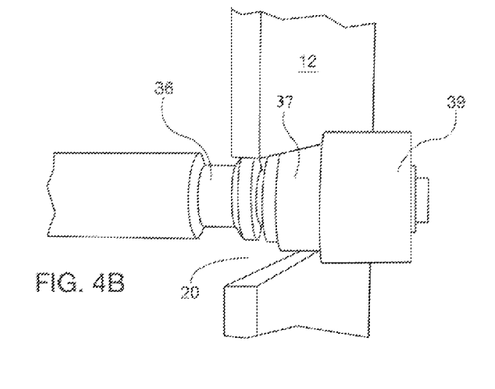
FIG. 4B is a side view of one separating bar within a track as used in the device disclosed herein and showing a spacer capping the end of the separating bar.

The separating bars of this invention are unique in the fact that they are disconnected from one another and allowed to move freely through the system of the separating device (10). The separating bars may be characterized by their internal components, such as magnets (FIG. 3C, Reference 32) or by an external component such as a brush or a filter on the body of the separating bar. The separating bars (35) may be distinct from one another (i.e., not attached by a chain or a belt) because they have components that allow for controlling positions in the track of the separation device. As shown in FIGS. 3A and 3B, the separating bars are characterized in part by wheels (37) at each end of the elongated body of the separating bar. The wheels are attached to the separating bars by axles (36) in each separating bar. The wheels engage the track as shown in FIGS. 4A and 4B.

In one embodiment of the invention, the wheels (37) are formed with an integral flange (38). The wheels (37) have a first diameter suitable to fit within the track (20) and traverse the enclosure. The overall wheel, however, may have an outer section of a greater diameter, forming the integral flange (38). The flange (38) is positioned on the outside of the overall enclosure and ensures that the wheel (37) (or the smaller diameter portion of the overall wheel) does not become immovable within the track (20) if the separating bar traverses the enclosure at an angle that causes the wheel (37) to bear against the track in a tight fit. In other words, the flange causes the separating bar to be self-aligning within the enclosure and ensures that the wheel (37) is capable of moving within the track even if the separating bar is moving at an angle relative to the central axis of the enclosure. The separating bar may have only one flange at each end of the separating bar, positioned on the outside of the enclosure, although other embodiments may be possible depending upon the shape of the track and the desired tolerances for track dimensions. Other embodiments may include a separate piece for the flange as well. It is also notable that the flange ensures that the end of a separating bar does not allow the separating bar to fall out of the enclosure.

The spacing of the separating bars may be further controlled by spacers (39) attached to the separating bar adjacent the flange (38) on the outside of each end of the separating bars. The spacers (39) engage the separation device (10) at points on the outside of the opposing walls (12) defining the track (20). The spacers (39) help to ensure that the bars do not get turned to an angle within the track and get stuck therein. The size of the spacers (39) also offers another avenue for controlling the spacing of the bars, the number of bars in proximity with the mixture at any given time, the number of bars in the tank at any given time, and the overall amount of separation processes occurring in the system. The spacers also serve as a push point for moving the bars by an outside force if necessary.

An example of one set-up of the separation device (10) may be useful in understanding the scope of the invention. Dirty mixtures of liquids, gases, or solids are pumped from a larger, more expansive industrial environment into the tank region (18) of the separation tank (10) via inlet (14). One goal is to ensure that the mixture to be separated is in contact with an active region of each separating bar used in the device. The active region of the separating bar may be a surface that is chemically, electrically, or physically responsive with the target substance to be removed from the mixture and collected onto the separating bar. One logical example is a magnetic material in the mixture attracted to an opposite polarity magnet within or on the separating bar (35).

To control the amount of time that a mixture, such as a used and dirty coolant fluid, is in contact with a separating bar or a group of separating bars, one must determine the number of separating bars to be used in the system, the size of the bars, and the number of bars that will be present within the tank region (18) at any given time (i.e., the dimensions of the tank and the separating bars can be optimized and scaled for different processes). The inlet (14) feeds the used or dirty mixture (containing the target substance) into the tank region (18). Another means of controlling the amount of mixture in the tank region and the duration of time that the mixture contacts the separating bars (35) is by using a perforated plate between the inlet (14) and the outlet (15). The size of the perforations in the plate determine the amount of time that the mixture remains in the tank between the inlet and the outlet, and, therefore, in contact with the separating bars (35). Once the mixture passes through the tank across the separating bars and through the perforated plate, the mixture, minus the target substance collected onto the separating bars, exits the tank through the outlet (15). Simultaneously, the separating bars travel around a track formed within the enclosure of the separating tank (10) while allowing the separating bars to roll through the enclosure. Rolling through the tank region (18) allows for more contact between the mixture and the surface of the separating bars. When the separating bars (35) roll through the tank region (18), they collect a target substance on their respective surfaces.

The compression in the system, maintained as described above, ensures the proper number and positioning of the separating bars in the tank region and the timing by which each separating bar enters and exits the tank region. After being pushed one-by-one through the tank, the separating bars exit the tank and enter a cleaning area. One cleaning mechanism may use a bar wiper assembly conveyor that has a series of urethane wipers for stripping the bars of their collected target substance removed from the mixture. In one embodiment, each bar is cleaned multiple times by separate wipers.

Once the cleaning is complete, the clean separating bar continues to traverse the track (20) until it is picked up by the push mechanism (40) that moves the separating bar along the track via a motor driven belt (42). The push mechanism applies enough downward force on the separating bars to force the separating bar through the controlled release mechanism (45) and to cause the series of separating bars in the tank (18) to move over and up by one bar. Accordingly, one of the separating bars opposite the controlled release mechanism and past the cleaning system pops up to make room for the newly arriving bar.

Figure 8:
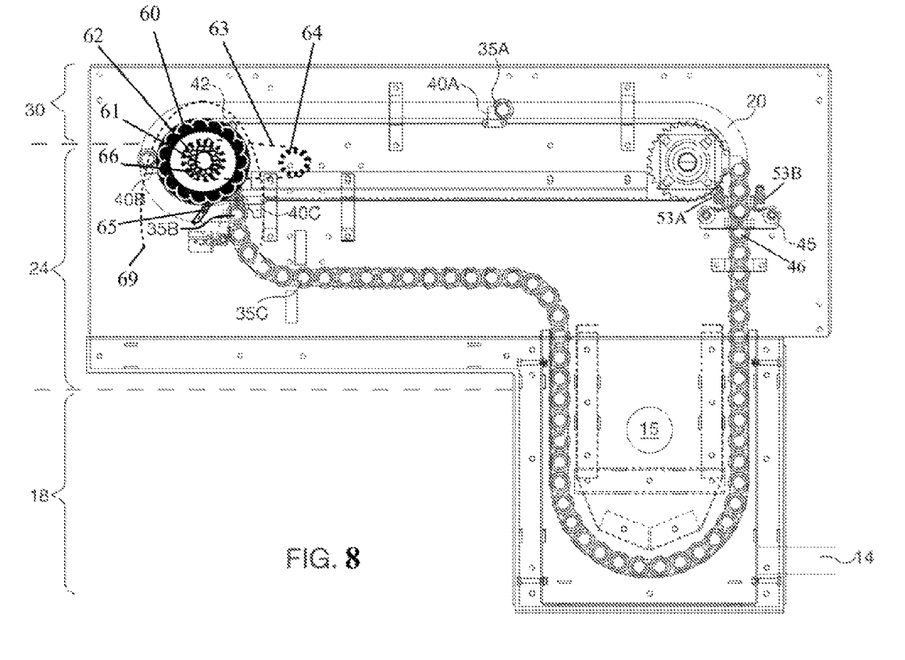
FIG. 8 is a cross sectional view of the overall device having a brush installed on a shaft for cleaning the bars as the bars traverse a track.
Figure 9:
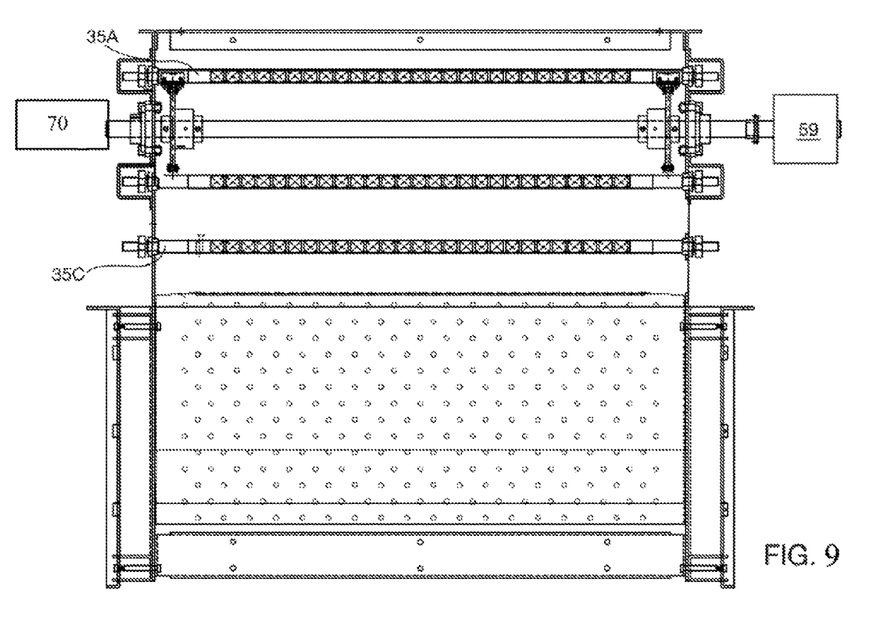
FIG. 9 is a side view of the device of FIG. 8 showing a motor for driving the brush assembly.

FIGS. 8 and 9 show yet another embodiment of the invention in which the cleaning mechanism is a brush (60) mounted adjacent the track (20). Separating bars (35) traverse the track and encounter the brush at one side of the device. The brush (60) is mounted on the same, common shaft (61) as the belt sprocket (FIG. 2, Ref 21B). The brush (60), however, is driven by a separate motor (FIG. 9, Ref. 70) from the motor (59) driving the belt (42). A brush pulley (62) surrounds the common shaft (61) and is separated from the common shaft (61) by shaft roller bearing (66) (represented in FIG. 8 by a series of small ovals adjacent the brush pulley (62)). The motor (70) drives motor pulley (64), and the motor pulley is connected to brush pulley (62) by a timing belt (63). The brush motor (70) rotates the brush in a direction that is opposite the rotation of the common shaft (61) (i.e., the brush (60) rotates oppositely of the direction that the belt (42) moves the separating bars (35). By engaging the brush (60) near the track (20), the separating bars (35) rotate about their own respective central axes so that the brush is able to clean the entire circumference of each separating bar (35). The components of the overall brush assembly may be of any dimension necessary to accomplish the purpose of the brush.

The brush assembly is protected by a guard (69) extending around the brush to prevent materials removed from the brush from being sprayed about the device. The guard (69) opens to a hopper, and the brush (60) slings debris removed from the separating bars (35) with sufficient force that the debris falls into the hopper (not shown). This embodiment allows for the debris to be collected without requiring an auger, push conveyor, or some other driven mechanism to move material off the bars and into a collection system.

The overall system allows for an automated cleaning apparatus that requires no computerized control because the amount of time a separating bar engages the mixture can be controlled by the number of separating bars, the number of push mechanisms moving the separating bars, the size of the bars, and the size of the spacers distancing the separating bars from one another in the track.

The invention is further set forth in the claims below.

The invention claimed is:

1. A device for separating components of a mixture, the device comprising:
    an enclosure for holding the mixture, said enclosure comprising:
        opposite walls defining respective tracks within said opposite walls;
        a free roll region;
        a compression region; and
        a tank region;
    a plurality of separating bars positioned within said respective tracks such that said plurality of separating bars move independently of one another through said free roll region, said compression region, and said tank region; and
    a moving belt extending across the device, said belt comprising a push mechanism engaging at least one of said plurality of separating bars and moving said at least one of said plurality of separating bars along said tracks.

2. A device according to claim 1, wherein said belt comprises a plurality of push mechanisms, wherein each push mechanism engages a respective separating bar.

3. A device according to claim 1, wherein said belt moves via a controllable motor.

4. A device according to claim 3, wherein said motor controls the rate at which said bars traverse said respective tracks.

5. A device according to claim 1, comprising a controlled release system for said separating bars moving within said respective tracks, wherein said controlled release system comprises a shutter assembly for releasing a first separating bar into a vertical portion of said respective tracks.

6. A device according to claim 5, wherein said controlled release system comprises a raised notch within said respective tracks for receiving an oppositely positioned separating bar within said track upon the release of said first separating bar.

7. A device according to claim 6, wherein said controlled release system is mechanically timed to allow a push mechanism to move said oppositely positioned separating bar from said raised notch.

8. A device according to claim 1, comprising a second set of tracks positioned within said respective tracks.

9. A device for separating components of a mixture, the device comprising:
    an enclosure for holding the mixture, said enclosure comprising:
        opposite walls defining respective tracks within said opposite walls;

a free roll region;
a compression region; and
a tank region;
a plurality of separating bars positioned within said respective tracks such that said plurality of separating bars move independently of one another through said free roll region, said compression region, and said tank region; and
a separating bar cleaning mechanism adjacent said tracks.

10. A device according to claim 9, wherein said cleaning mechanism comprises a chain extending from one side of the device to another and pushes debris off respective bars.

11. A device according to claim 9, wherein said cleaning mechanism comprises a wiper that scrapes across respective bars.

12. A device according to claim 9, wherein the cleaning mechanism is a brush mounted adjacent a portion of the respective tracks, said separating bars traveling against the brush for cleaning.

13. A device according to claim 12, comprising a brush motor for rotating said brush about a shaft.

14. A device for separating components of a mixture, the device comprising:
an enclosure for holding the mixture, the enclosure comprising:
two opposing walls, each opposing wall comprising a track;
a free roll region;
a compression region; and
a tank region; and
at least two separating bars, each separating bar extending between the opposing walls and engaging the tracks such that said plurality of separating bars move independently of one another through said free roll region, said compression region, and said tank region.

15. The device according to claim 14, wherein the tracks are substantially identical continuous tracks.

16. The device according to claim 14, wherein the opposing walls define cut-outs forming the tracks.

17. The device according to claim 14, wherein each separating bar comprises an elongated body and an axle extending from the elongated body.

18. The device according to claim 14, wherein each separating bar comprises a wheel positioned at each end of the separating bar.

19. The device according to claim 14, wherein each separating bar comprises:
a wheel positioned at each end of the separating bar; and
a flange adjacent each wheel.

20. The device according to claim 14, wherein each separating bar comprises one or more batteries.

* * * * *